(12) United States Patent
Altman

(10) Patent No.: US 7,021,884 B1
(45) Date of Patent: Apr. 4, 2006

(54) REMOVABLE TIRE CADDY AND METHOD OF USE

(76) Inventor: Joseph M. Altman, 24245 Woodland Dr., Southfield, MI (US) 48034

( * ) Notice: Subject to any disclaimer, the term of this patent is extended or adjusted under 35 U.S.C. 154(b) by 105 days.

(21) Appl. No.: 10/142,456

(22) Filed: May 10, 2002

(51) Int. Cl.
*B62D 43/04* (2006.01)

(52) U.S. Cl. .................... 414/463; 280/79.5; D34/24

(58) Field of Classification Search ............... 414/463, 414/464, 465, 466, 426; 280/79.5, 79.6, 280/79.4, 79.11, 652; D32/24
See application file for complete search history.

(56) References Cited

U.S. PATENT DOCUMENTS

| | | | |
|---|---|---|---|
| 3,390,864 A | | 7/1968 | Searcy et al. |
| 3,494,493 A | * | 2/1970 | Fowler .................. 414/466 |
| 3,554,397 A | | 1/1971 | Cluff |
| 3,874,536 A | | 4/1975 | Watanabe |
| 4,047,629 A | | 9/1977 | Klein |
| 4,059,197 A | | 11/1977 | Iida |
| 4,418,852 A | * | 12/1983 | Grinwald .............. 224/42.23 |
| 4,449,881 A | * | 5/1984 | Lane ...................... 414/428 |
| 4,492,506 A | | 1/1985 | Hoagland et al. |
| 4,544,136 A | | 10/1985 | Denman et al. |
| 4,597,711 A | * | 7/1986 | Liebermann ............ 414/427 |
| 4,625,947 A | | 12/1986 | Denman et al. |
| 4,632,288 A | * | 12/1986 | Bullock ................. 224/42.12 |
| 4,890,970 A | * | 1/1990 | Willits .................... 414/462 |
| 4,915,358 A | | 4/1990 | Stallings |
| 4,969,630 A | | 11/1990 | Denman et al. |
| 5,060,912 A | | 10/1991 | Guarr |
| 5,297,913 A | | 3/1994 | Au |
| 5,314,288 A | | 5/1994 | Schmidt |
| 5,356,163 A | * | 10/1994 | Suggs, Sr. .............. 280/47.27 |
| D377,254 S | * | 1/1997 | Cavalliere .............. D34/24 |
| 5,718,553 A | | 2/1998 | Via et al. |
| 5,860,786 A | * | 1/1999 | Aubrecht ............... 414/463 |
| 6,682,084 B1 | * | 1/2004 | Webster et al. ......... 280/79.5 |

FOREIGN PATENT DOCUMENTS

JP        11-11120    *  9/1997

* cited by examiner

*Primary Examiner*—Eileen D. Lillis
*Assistant Examiner*—Charles A. Fox
(74) *Attorney, Agent, or Firm*—R. Scott Vincent

(57) ABSTRACT

A removable tire caddy and method of use for providing convenient access and manipulation of a vehicle-mounted spare tire. The removable tire caddy includes a wheeled carriage frame designed to support a tire on at least two wheels. In the center of the carriage is a structure for engaging a cable of a spare tire lift-and-carry apparatus that extends or retracts to move the spare tire and wheeled carriage between a release position and a storage position under the vehicle. When the carriage is disengaged from the cable, the user is able to move the tire about easily as the weight of the tire and carriage are borne by the wheels.

20 Claims, 4 Drawing Sheets

REMOVABLE TIRE CADDY AND METHOD OF USE

BACKGROUND OF THE INVENTION

1. Field of the Invention

The present invention relates to spare tire vehicle mounting methods and apparatus and more particularly pertains to a new removable tire caddy and method of use for providing convenient access and manipulation of a vehicle mounted spare tire.

2. Description of the Prior Art

The use of spare tire vehicle mounting methods and apparatus is known in the prior art. More specifically, spare tire vehicle mounting methods and apparatus heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 4,884,729, which teaches a tire rack hingedly mounted to a vehicle that can be lowered from a storage position to a release position by use of a mechanical gear system. The invention does not include a removable assembly.

U.S. Pat. No. 5,718,553 teaches an invention for lowering a spare tire from a position of storage to a release position through means of a retaining cable attached to a wheel engaging member. While the present invention has similar apparatus to this invention, the present invention disclosed herein has significant and distinct improvements over this prior art invention.

U.S. Pat. No. 5,860,786 teaches a support shelf for a spare tire which is connected to the underside of a vehicle. The entire shelf is able to raise and lower through means of telescoping supports and tension cables driven by a crank assembly. The shelf includes a pair of channel rail guides that hold the removable shelf upon which the spare tire resides. The present invention does not rely upon the complex apparatus of frame support structures, telescoping vertical supports or a slidable support shelf, which results in a mechanically simpler, more reliable and easier to use device than disclosed in this reference.

U.S. Pat. No. 5,993,133 teaches spare tire carrier similar to the support shelf of U.S. Pat. No. 5,860,786 for lowering the tire from a storage position, but relies upon a cantilever arm to extend the tire to the position of release. The apparatus disclosed in this patent does not include a removable carriage.

U.S. Pat. No. 6,053,690 teaches a shelf like system similar to U.S. Pat. Nos. 5,860,786 and 5,993,133, and utilizes a relatively square carrier that encompasses the entire spare tire (and is referred to as a tire pod). This patent does not teach the removal of the tire pod or the ability to support the tire pod on wheels outside of the mounting assembly.

While these devices fulfill their respective, particular objectives and requirements, the aforementioned patents do not disclose a new removable tire caddy and method of use. The inventive device includes a wheeled carriage frame designed to support a tire on two or more wheels. In the center of the carriage is a site to engage a cable of a spare tire lift-and-carry apparatus as is commonly known in the art.

In these respects, the removable tire caddy and method of use according to the present invention substantially departs from the conventional concepts and designs of the prior art, and in so doing provides an apparatus primarily developed for the purpose of providing convenient access and manipulation of a vehicle mounted spare tire.

SUMMARY OF THE INVENTION

In view of the foregoing disadvantages inherent in the known types of spare tire vehicle mounting methods and apparatus now present in the prior art, the present invention provides a new removable tire caddy and method of use construction wherein the same can be utilized for providing convenient access and manipulation of a vehicle mounted spare tire.

The general purpose of the present invention, which will be described subsequently in greater detail, is to provide a new removable tire caddy apparatus and method which has many of the advantages of the spare tire vehicle mounting methods and apparatus mentioned heretofore and many novel features that result in a new removable tire caddy and method of use which is not anticipated, rendered obvious, suggested, or even implied by any of the prior art spare tire vehicle mounting methods and apparatus, either alone or in any combination thereof.

To attain this, the present invention generally comprises a wheeled carriage frame designed to support a tire on two or more wheels. In the center of the carriage is a site to engage a cable of a spare tire lift-and-carry apparatus that extends or retracts to move the spare tire and wheeled carriage between a release position and a storage position under the vehicle. Furthermore, when the carriage is disengaged from the cable, the user is able to move the tire about easily as the weight of the tire and carriage are born by the wheels.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new removable tire caddy apparatus and method which has many of the advantages of the spare tire vehicle mounting methods and apparatuses mentioned heretofore and many novel features that result in a new removable tire caddy and method of use which is not anticipated, rendered obvious, suggested, or even implied by any of the prior art spare tire vehicle mounting methods and apparatuses, either alone or in any combination thereof.

It is another object of the present invention to provide a new removable tire caddy and method of use, which may be easily and efficiently manufactured and marketed.

It is a further object of the present invention to provide a new removable tire caddy, which is of a durable and reliable construction.

An even further object of the present invention is to provide a new removable tire caddy, which is susceptible of a low cost of manufacture with regard to both materials and labor, and which accordingly is then susceptible of low prices of sale to the consuming public, thereby making such removable tire caddy economically available to the buying public.

Still yet another object of the present invention is to provide a new removable tire caddy and method of use, which provides in the apparatuses and methods of the prior art some of the advantages thereof, while simultaneously overcoming some of the disadvantages normally associated therewith.

Still another object of the present invention is to provide a new removable tire caddy and method of use for providing convenient access and manipulation of a vehicle mounted spare tire.

Yet another object of the present invention is to provide a new removable tire caddy and method of use, which includes a wheeled carriage frame designed to support a tire on two or more wheels. In the center of the carriage is a site to engage a cable of a spare tire lift-and-carry apparatus that extends or retracts moving the spare tire and wheeled carriage between a release position and a storage position under the vehicle.

Still yet another object of the present invention is to provide a new removable tire caddy and method of use that is easily transportable when disengaged from the vehicle mount.

These together with other objects of the invention, along with the various features of novelty, which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
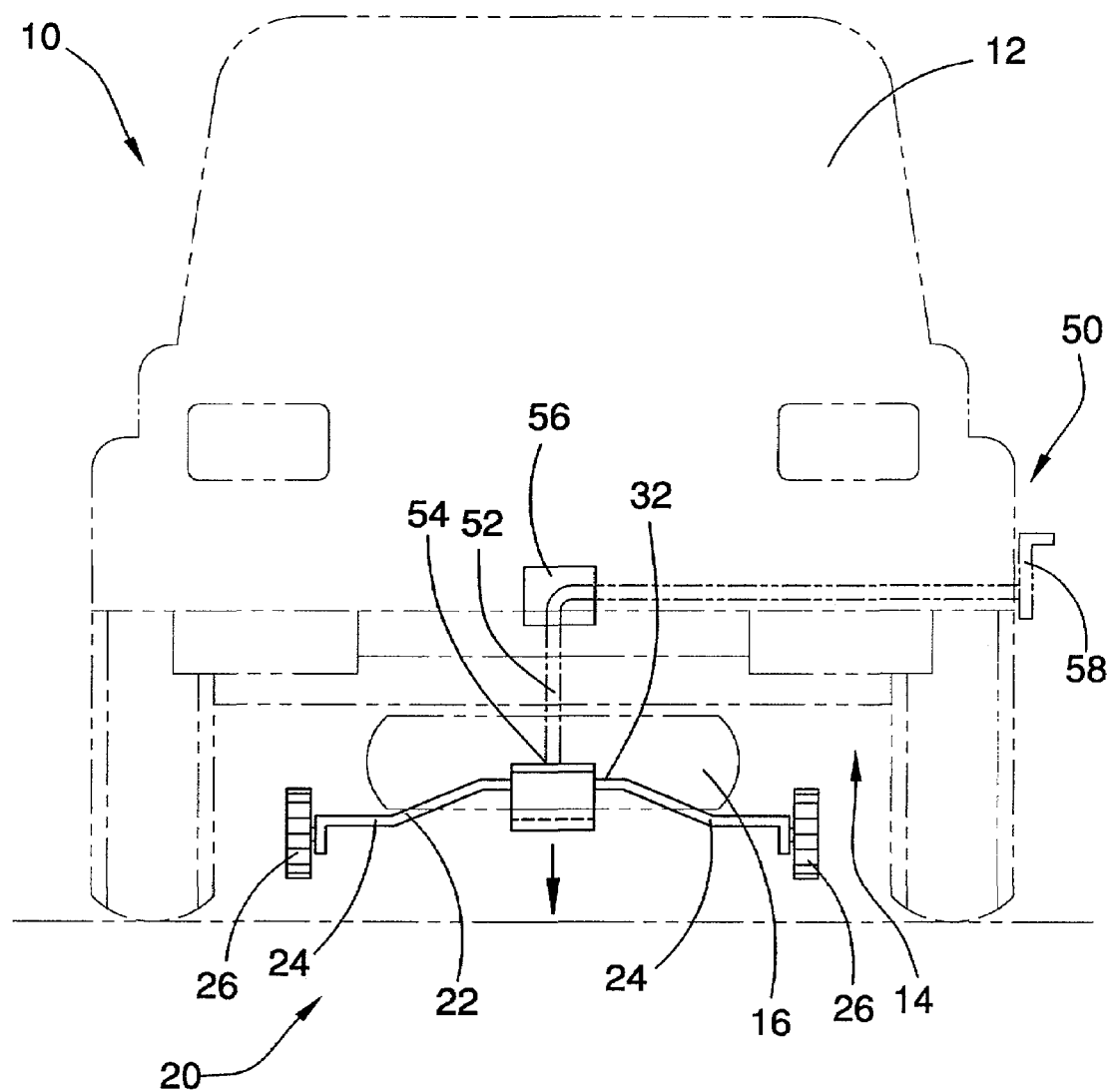
FIG. 1 is a rear profile view of a new removable tire caddy suspended underneat a vehicle in the storage possition according to the present invention.

With reference now to the drawings, and in particular to FIGS. 1 through 4 thereof, a new removable tire caddy embodying the principles and concepts of the present invention and generally designated by the reference numeral 10 will be described.

As best illustrated in FIGS. 1 through 4, the removable tire caddy 10 may generally comprise two main assemblies. The first assembly is the carriage 20 and the second assembly is the spare tire lift and carry apparatus 50.

The carriage 20 may comprise a frame 22 for supporting a spare tire 16. The frame may comprise four arms 24 that radiate from a central portion 32 and extend to a distance sufficient to contact and support an ample portion of the spare tire 16, but the invention is not so limited. For example, the carriage 20 could employ as few as three arms 24 and still function as described below. Optionally, a multitude of arms 20 or supporting surfaces could serve to perform the same function as the four arms 20 used in the example. One preferred embodiment of the invention has four arms 20 for the purpose of simplicity in that a four arm design can easily be constructed by connecting two pieces of flatbar in a cross configuration.

Figure 2:
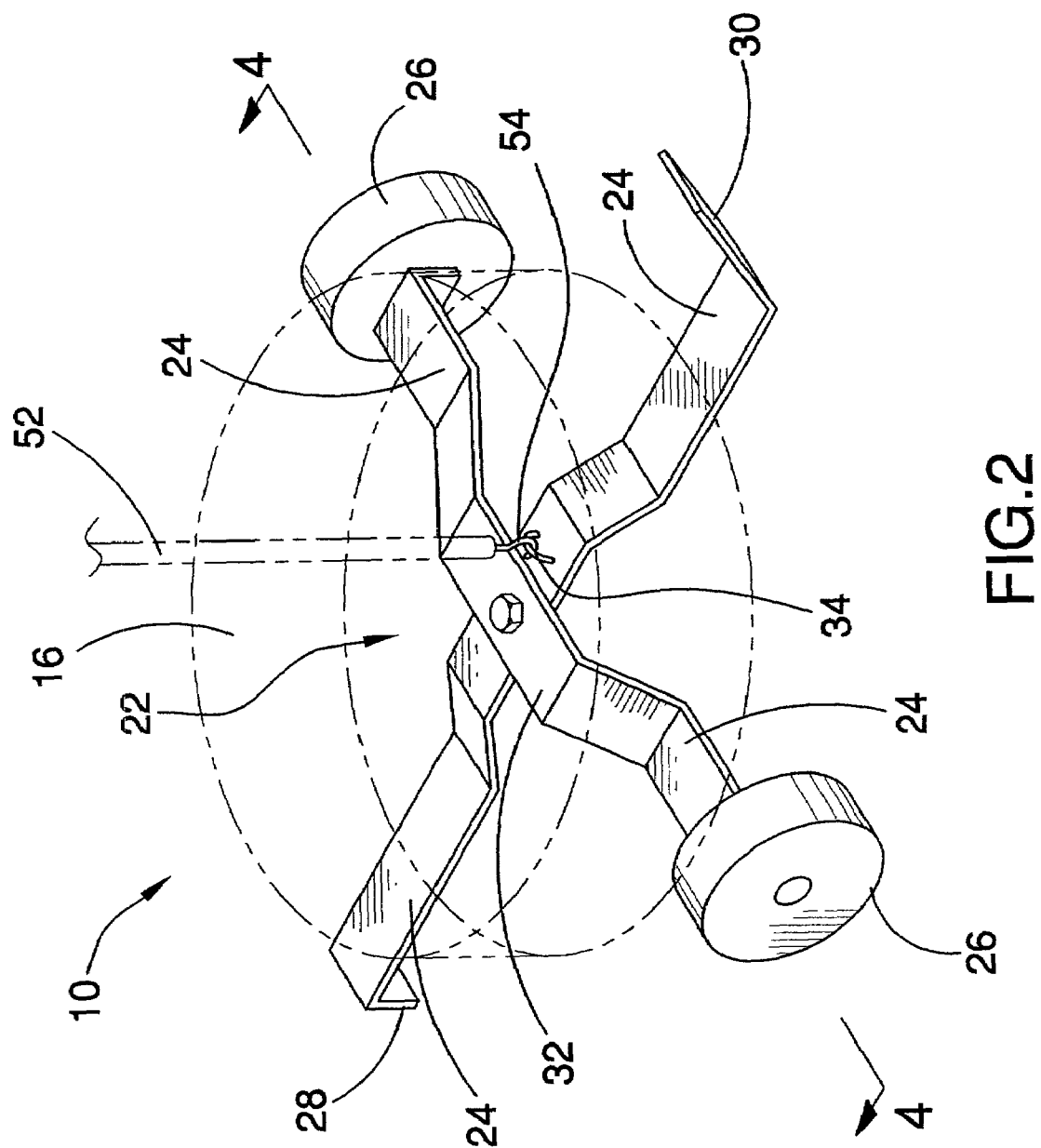
FIG. 2 is a perspective view of the present invention showing the relation of the carriage to the tire.

The arms 20 of the carriage may be bent for the purpose of keeping the spare tire 16 placed centrally on the carriage 20. FIG. 2 best illustrates the contouring of the arms 24 that raises the central portion 32 higher that the ends of the arms 24 to fit within the central cavity of the spare tire 16.

At the end of the arms 24 there may be included functional elements of the invention. These elements may include wheels 26, handle 30, and a foot 28.

Wheels 26 may be located at two or more ends of the arms 20. Practical placement may include generally opposing ends of the arms 24 and may comprise several wheel types such as a simple solid wheel and axle as depicted in the drawings, or optionally caster wheels, pneumatic wheels, multi wheel treads, collapsible wheels, pedrail wheels etc. employed with or without an articulated suspension structure.

A handle 30 may be located at the end of one or more of the arms 24. The handle 30 may simply comprise a section of the arm 24 formed so that the user may grip it, or optionally may include a sleeve of conformable material formed in a configuration fashioned for gripping. The handle 30 may be mounted in a horizontal, vertical, or diagonal position relative to the arm 24.

A foot may be located at another end of one or more of the arms 24 that would assist in supporting the carriage 20 in union with the wheels 26 when not in motion. Like the handle 30, the foot may simply comprise the end of one of the arm 24 sections or may include a resistant, non-skid gripping material attached to the end of the arm to keep the carriage 20 from moving when idle.

To promote more convenient use of the handle 30 and foot 28 elements of the carriage 20, it may be beneficial to set the weight of the frame 22 slightly off center. The center of gravity may be positioned slightly toward the foot 28 end of the fulcrum defined by the axles of the wheels 26. In this configuration, the weight of the carriage 20 may be distributed substantially on the wheels 26 with a portion of the weight being borne by the foot 28. This design would assure that, when idle, the carriage would rest on the foot leaving the handle free to be easily grasped and preventing the carriage from rolling away.

An engagement device 34 may be incorporated on the central portion of the carriage 20 an engagement device 34. Such a device may comprise a variety of structures to attach a cable to the carriage. For example, such structures may include a hook, an eye bolt, a hole, a clamp, a clip, a latch, an open loop, a spring fastener, a narrowed section of the arm, a tension connector, and a capture block. A plurality of devices for attaching a cable to an object are known to those of skill in the art and it is anticipated that any of these methods or devices could be employed to practice the invention. The cable engagement device 34 may be used to connect the carriage with or without a spare tire to a spare tire lift and carry apparatus 50.

The spare tire lift and carry apparatus 50 is well known in the art having been defined in the prior art. For example, U.S. Pat. Nos. 3,390,864; 3,554,397; 3,874,536; 4,047,629; 4,059,197; 4,492,506; 4,544,136; 4,625,947; 4,915,358; 4,969,630; 5,060,912; 5,297,913; 5,314,288; and 5,718,553 all teach various manners of moving a tire between a position of access, generally on the ground, and a position of storage, generally located underneath the undercarriage of a vehicle. Each of these reference disclose a flexible member 52, such as a chain or cable, connected directly to the spare tire 16 or a support hub device via a coupling device 54 that couples to the engagement device 34 for supporting the spare tire 16. The flexible member is connected to a take up means 56 for retracting the flexible member and the spare tire 16, and the take up means may comprise a winch, a windlass, a take up reel, a cable drum, etc. A motivator 58 such as a crank, ratchet, motor, lever, etc could drive the take up means. The entire apparatus 50 may be connected to, integrated into, or mounted upon the vehicle 12.

The present invention could incorporate any of the prior art methods for retracting and releasing the spare tire 16 and the carriage 20 with respect to the undercarriage 14 of a vehicle 12, but departs from the prior art in the design and use of the carriage 20.

In use, the removable tire caddy 10 supports a spare tire 16 underneath the undercarriage 14 of a vehicle 12. The vehicle 12 undercarriage 14 may include a cavity to encompass the spare tire 16.

The spare tire may reside on the frame 22 of the carriage 20 in a position centered on the frame 22 due to the raised central portion 32 of the frame 22 nesting in the inner hub of the spare tire 16. A flexible member 52 may be connected to the carriage 20 by a coupling device 54 engaged with the engagement device 34 of the carriage 20. The coupling means between elements 34 and 54 could take a plurality of forms, such as those forms disclosed for element 34.

Figure 3:
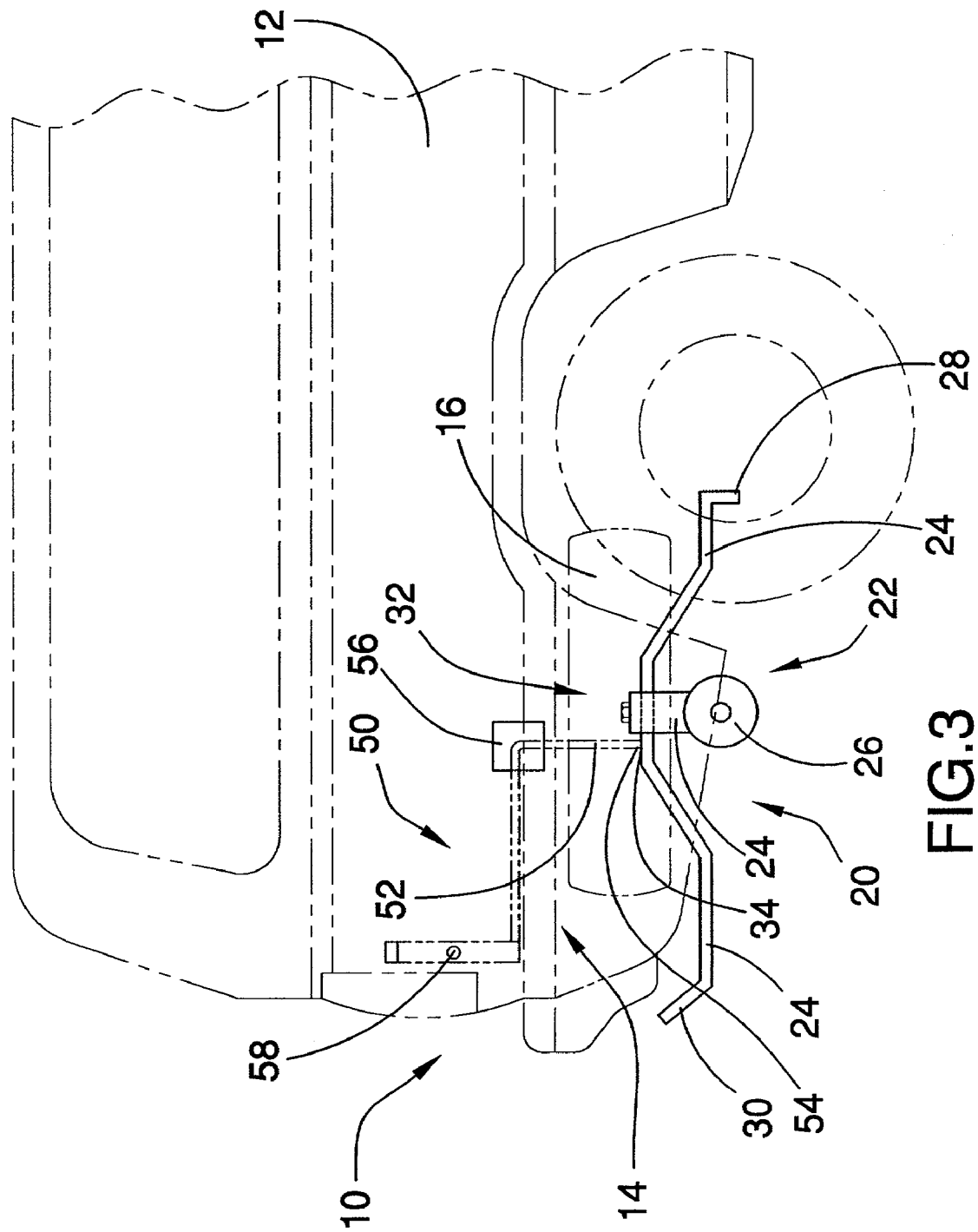
FIG. 3 is a side profile view of the present invention suspended underneat a vehicle in the storage possition.
Figure 4:
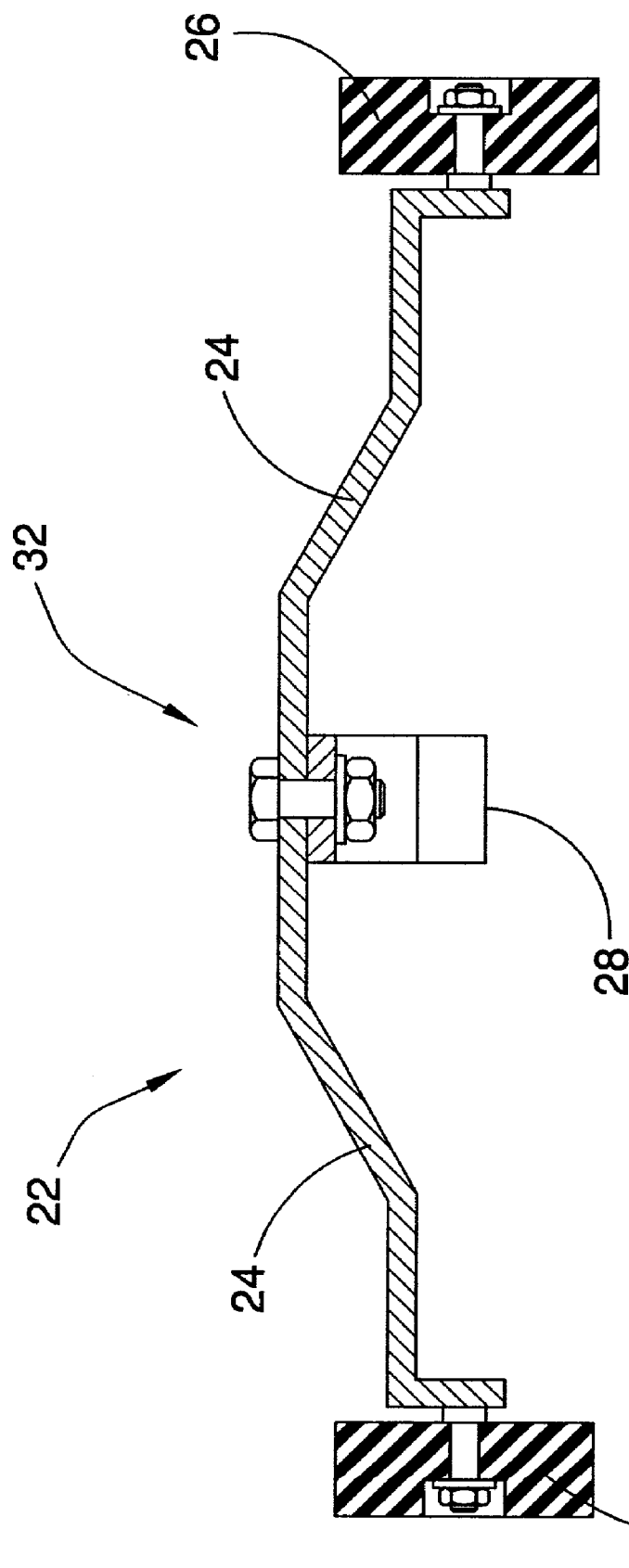
FIG. 4 is a cross section view of the present invention.

When the user desires to access the spare tire 16, the user activates the motivator 58, which is illustrated in FIGS. 1 and 3 as a crank. The crank would extend the flexible member 52 from the take up means 56 and lower the carriage 20 and the spare tire 16 to the ground. An adequate length of the flexible member 52 would be extended to allow the user to grasp the handle 30 of the carriage 20 and pull the carriage 20 to a position sufficiently out from underneath the vehicle 12 to conveniently disengage the coupling device 54 from the engagement device 34.

Once the spare tire 12 and caddy 10 have been removed from the spare tire lift-and-carry apparatus 50, the caddy 10 can be used to carry the spare tire to anywhere the user desires. The wheels of the carriage 20 make it easy to pull the carriage 20 to the location where the spare tire 16 is needed. The user may hold the handle 30 and push down, thus shifting a small portion of the weight of the spare tire from the foot to the wheels 26. The user can then pull the caddy by the handle 30 to direct the carriage 20 to the desired location. The tire 16 can then be taken off of the carriage 20 for change-out, servicing, replacement, etc. The carriage 20 will resist any tendency to roll away from the user due to the weight bearing on the foot 28 when the carriage is idle.

When the change-out, service or replacement tire has been completed, the spare tire may be placed back on the carriage 20 and the carriage rolled back to the undercarriage 14 of the vehicle 12. The coupling device 54 can then be reattached to the engagement device 34. The user then uses the motivator 58 to retract the flexible member 52 with the take up means 56. This retraction movement will at first draw the carriage 20 and spare tire 16 under the vehicle 12 and then hoist the carriage 20 and spare tire 16 into the position of storage underneath the vehicle's 12 undercarriage 14.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed is:

1. In combination:
    a spare tire lift and carry apparatus mounted on the underside of a vehicle, the apparatus including a cable depending downwardly from the underside of the vehicle and a coupling device mounted on a free end of the cable; and
    a device for supporting a tire that couples to the spare tire lift and carry apparatus of the vehicle, the device comprising:
        a frame that accommodates the tire;
        at least two wheels connected to the frame; and
        an engagement device that couples to the coupling device of the spare tire lift ard carry apparatus;
        the frame comprising a plurality of at least four arms radiating from a central portion of the frame, each of the arms having outboard portions located radially outward from the central portion, a section of each of the outboard portions lying substantially in a plane;
        a foot of the frame being disposed on an end of one of the arms;
        the arms being contoured with the central portion being raised with respect to the plane;
        the engagement device being centrally located on the frame; and
        the frame including a handle extending from the plane on an end of a second arm.

2. The device of claim 1 wherein the plurality of arms is four arms and the two wheels are connected to the frame for supporting the weight of the frame and a tire accommodated by the frame.

3. The device of claim 1 wherein the foot of the frame extends downwardly from the plane for selectively engaging a ground surface to inhibit inadvertent rolling of the frame along the ground surface when the engagement device of the frame is disengaged from the spare tire lift and carry apparatus.

4. The device of claim 1 wherein the raised central portion being nestable in an inner hub of the tire; each of the wheels being connected to ends of a pair of the arms radiating in opposite directions; and the center of gravity of the frame is located towards the foot of the frame as defined by a fulcrum created by the supporting wheels so that the frame rests on the wheels and the foot when the wheels are rested on the ground surface.

5. The device of claim 1 wherein the handle extends upwardly with respect to the plane; and the handle being disposed on one of the arms located opposite of the arm on which the foot is mounted.

6. A device for supporting a spare tire removably mounted on the spare tire lift and carry apparatus of the vehicle, the device comprising:
   a frame on which the spare tire is removably mountable, the frame including:
   a plurality of at least four arms radiating outwardly from a central portion of the frame;
   a foot mounted on one of the arms for selectively engaging the ground surface;
   a handle mounted on one of the arms for being gripped by a hand of the user; and
   at least two wheels mounted on the frame for facilitating movement of the frame across a ground surface; and
   an engagement device mounted on the frame and being capable of coupling to a coupling device of the spare tire lift and carry apparatus,
   wherein the foot is located on a first one of the plurality of arms toward an outer end of a first arm, the foot extending downwardly from a plane formed by the arms.

7. The device of claim 6 wherein each of the arms having outboard portions located radially outward from the central portion, a section of each of the outboard portions of the arms lying in a common plane.

8. The device of claim 7 wherein the arms are contoured with the central portion being raised upwardly with respect to the plane, the raised central portion being nestable in an inner hub of the fire.

9. The device of claim 6 wherein the plurality of arms comprising four arms.

10. The device of claim 6 wherein the foot being formed by a downturned outer end section of the first arm.

11. The device of claim 6 wherein the handle is located on a second one of the plurality of arms, the handle extending upwardly with respect to the plane.

12. The device of claim 11 wherein the handle is disposed on the second arm toward an outer end of second arm, the second arm extending in an opposite direction with respect to a first arm of the plurality of arms on which the toot Is mounted.

13. The device of claim 12 wherein the handle is formed by an upturned outer end section of the second arm.

14. The device of claim 6 wherein each of the at least two wheels are respectively coupled to two of the arms of the plurality of arms that radiate in opposite directions with respect to each other.

15. The device of claim 6 wherein the engagement device is mounted on the frame, the engagement device being substantially centrally located on the frame.

16. The device of claim 15 wherein the engagement device being located on the raised central portion of the frame.

17. The device of claim 6 wherein a center of gravity of the frame is located towards the foot of the frame as defined by a fulcrum created by the supporting wheels so that the frame rests on the wheels and the foot when the wheels are rested on the ground surface.

18. The device of claim 6 wherein each of the arms having outboard portions located radially outward from the central portion, a section of each of the outboard portions of the arms lying in a common plane;
   wherein the arms are contoured with the central portion being raised upwardly with respect to the plane, the raised central portion being nestable in an inner hub of the tire;
   wherein the plurality of arms comprising four arms;
   wherein the foot is located on a first one of the plurality of arms toward an outer end of the first arm, the foot extending downwardly from the plane;
   wherein the foot being formed by a downturned outer end section of the first arm;
   wherein the handle is located on a second one of the plurality of arms, the handle extending upwardly with respect to the plane;
   wherein the handle is disposed on the second arm toward an outer end of second arm, the second arm extending in an opposite direction with respect to a first arm of the plurality of arms on which the foot is mounted;
   wherein the handle is formed by an upturned outer end section of the second arm;
   wherein each of the at least two wheels are respectively coupled to two of the arms of the plurality of arms that radiate in opposite directions with respect to each other;
   wherein the engagement device is mounted on the frame, the engagement device being substantially centrally located on the frame; and
   wherein a center of gravity of the frame is located towards the foot of the frame as defined by a fulcrum created by the supporting wheels so that the frame rests on the wheels and the foot when the wheels are rested on the ground surface.

19. In combination:
   a spare tire lift and carry apparatus mounted on the underside of a vehicle, the apparatus including a cable depending downwardly from the underside of the vehicle and a coupling device mounted on a free end of the cable; and
   a device for supporting a spare tire removably mounted on the spare tire lift and carry apparatus of the vehicle, the device comprising:
      a frame on which the spare tire is removably mountable, the frame including:
      a plurality of at least four arms radiating outwardly from a central portion of the frame, each of the arms having outboard portions located radially outward from the central portion, a section of each of the outboard portions of the arms lying substantially in a common plane, the arms being contoured with the central portion being raised upwardly with respect to the plane, the raised central portion being nestable in an inner hub of the tire,
      a foot for selectively engaging the ground surface, the foot being located on a first one of the plurality of arms toward an outer end of the first arm, the foot extending downwardly from the plane, the foot being formed by a downturned outer end section of the first arm;

a handle for being gripped by a hand of the user, the handle being located on a second one of the plurality of arms, the handle extending upwardly with respect to the plane, the handle being disposed on the second arm toward an outer end of second arm, the second arm extending in an opposite direction with respect to the first arm on which the foot is mounted, the handle being formed by an upturned outer end section of the second arm;

at least two wheels mounted on the frame for facilitating movement of the frame across a ground surface, each of the wheels being connected to two arms of the plurality of arms that radiate in opposite directions with respect to each other, and an engagement device couplable to a coupling device of the spare tire lift and carry apparatus, the engagement device being mounted on the frame, the engagement device being substantially centrally located on the frame;

wherein the center of gravity of the frame is located towards the foot of the frame as defined by a fulcrum created by the supporting wheels so that the frame rests on the wheels and the foot when the wheels are rested on the ground surface.

20. The device of claim 19 wherein the engagement device being located on the raised central portion of the frame, and the plurality of arms comprising four arms.

* * * * *